G. T. CAVILL.
CHANGE SPEED GEARING.
APPLICATION FILED FEB. 15, 1911.

1,046,552.

Patented Dec. 10, 1912.
3 SHEETS—SHEET 1.

Witnesses:
Anna Hoyer
M. Herskovits

George Thomas Cavill,
Inventor,
by
Alfred Muller
att'y

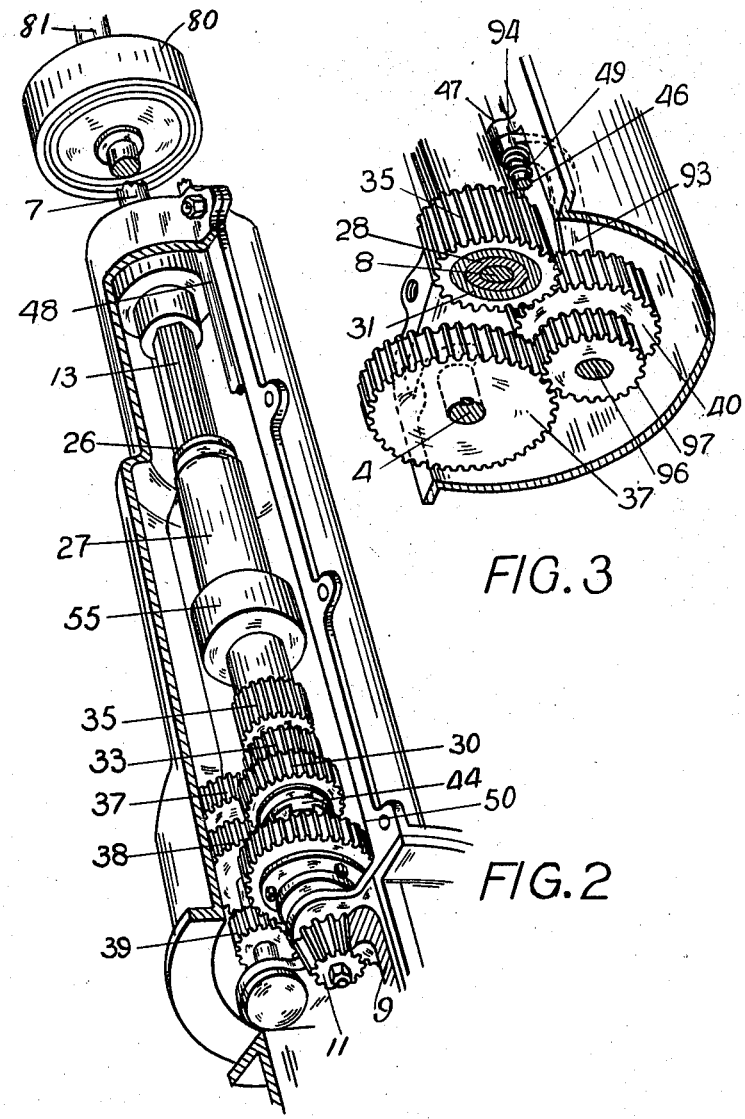

G. T. CAVILL.
CHANGE SPEED GEARING.
APPLICATION FILED FEB. 15, 1911.

1,046,552.

Patented Dec. 10, 1912.
3 SHEETS—SHEET 3.

Witnesses:

George Thomas Cavill,
Inventor,
by Alfred Müller
Atty

UNITED STATES PATENT OFFICE.

GEORGE THOMAS CAVILL, OF SYDNEY, NEW SOUTH WALES, AUSTRALIA.

CHANGE-SPEED GEARING.

1,046,552.

Specification of Letters Patent. Patented Dec. 10, 1912.

Application filed February 15, 1911. Serial No. 608,822.

*To all whom it may concern:*

Be it known that I, GEORGE THOMAS CAVILL, a subject of the King of Great Britain and Ireland, residing at 46 Dawson street, Surry Hills, Sydney, in the State of New South Wales, Australia, have invented certain new and useful Improvements in Change-Speed Gearing, of which the following is a specification.

My invention relates to toothed gearing for transmitting rotary motion, and particularly to that class of such gearing in which the driving and driven gears are mounted permanently in mesh, and in which any required one of the driving gears may be engaged to the driving element by a clutch while the other driving gears remain free, whereby a change in the speed ratio as between the driving and the driven element is obtained. Such gearing is used chiefly in automobiles, but is applicable also in lathes and other machinery in which a variable controllable relation is required between the driving and the driven elements.

In this specification the term "driving element" is applied to the engine or to a rotating part directly connected thereto, and "driven element" to an axle or shaft or other part which receives motion through the gearing from the driving element.

My principal object of the invention is to provide a form of mechanism in which toothed gears located intermediate between the driving element and the driven element in an automobile or other transmission system of variable speed gearing may be "changed" readily, positively, and smoothly during running without moving any of the intergeared wheels out of mesh; and in which also the road wheels or driven element will be geared automatically directly to the engine shaft when the rotational speed of the driven element exceeds the engine speed, thereby permitting the retardation of the engine to be used for braking purposes.

Figure 5:
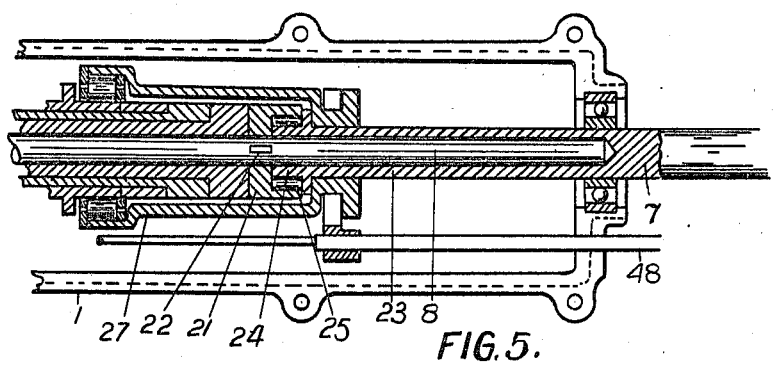
Figure 4:
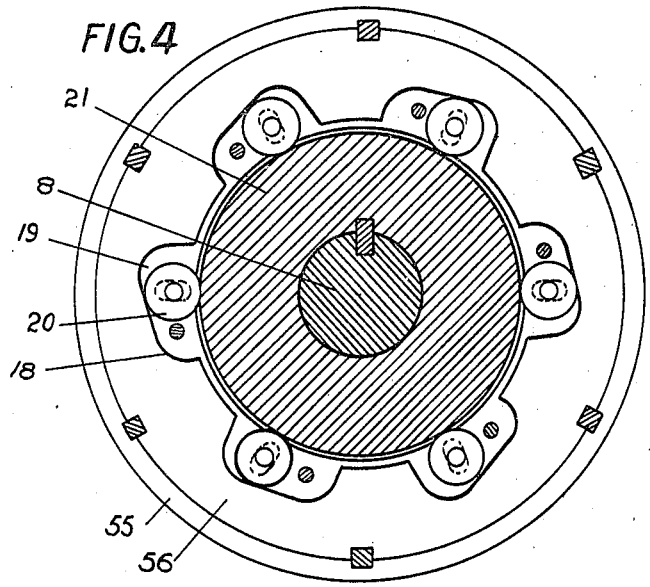

In the accompanying drawings, Figure 1 is a horizontal section through gearing mechanism according to my invention adapted especially for use in an automobile; Fig. 2 is a perspective view of the mechanism shown in Fig. 1, part of the upper casing and the yokes and yoke stem of the reversing mechanism not being shown; Fig. 3 is a fragment perspective view illustrating detail of the reversing mechanism; Fig. 4 is a cross section illustrative of the construction of the contracting clutch; Fig. 5 is a fragment section illustrating a preferred modification of the construction of parts associated with the "pick-up" clutch by which the driven element is geared to the driving element when the speed of the driven element becomes excessive; Fig. 6 is a transverse section through the coupler shaft and one of the externally castellated tubular shafts; and Fig. 7 is a view of the manual lever for operating the clutch rod.

1 is the casing containing suitable bearings 2 and 3 for the counter shaft 4, and 5 and 6 for the gear end of the driving shaft 7 and for the other end of the coupler shaft 8. 9 is the driven member, which is rotated by a toothed wheel 11 on the end of the coupler shaft 8.

13 is a tubular shaft made hexagonal or castellated externally or fitted with a feather key; it is rotatable upon the forward end of the coupler shaft 8; this tubular shaft 13 is coupled by means of the keyed collar 14 to the drum 15 which is on the end of the engine clutch shaft 7. 16 is a collar keyed at 17 to the coupler shaft 8. The collar drum 15 is formed interiorly with a number of inclined faces such as 18, Fig. 4, said faces forming the top sides of pockets 19 within which clutch rollers 20 (83 in Fig. 1) are set loosely. The inclined faces 18 are arranged anti-clockwise; that is to say, they are so arranged that when the shaft 7 tends to turn faster than but in the same direction as the shaft 8, the rollers 83 will run free, but when the shaft 8 should turn faster than and in the same direction as the shaft 7, as will be the case when the car moves fast while the engine is slowed up, then the rollers 83 engage the collar 16, as in a free wheel clutch, and the gearing tends to drive the engine, under which circumstances the retardation of the engine may be used as a braking force. In the construction shown in Fig. 5, which is in all respects substantially identical in principle of construction and function of parts with the arrangement shown in Fig. 1, the driving collar 21 which is keyed at 22 to the coupler shaft 8, is made as a drum, and the end of the driving shaft 7 is made tubular as shown at 23, and formed at its extreme end 24 to set into the drum collar 21, the end of the coupler shaft being journaled in the tubular shaft 23. Either the part 24 or the hollow ring of the collar 21 has a number of inclined faces similar to 18 cut in it, and rollers 25 similar to the rollers 20, Fig. 4, are set in the intermediate pockets (see 19, Fig. 4); these rollers coacting between the opposed inclined and cylindrical faces of the parts 21 and 24 form a clutch by which the coupler shaft 8 is connected automatically to the driving shaft 7 whenever the rotational speed of the coupler shaft 8 exceeds the speed of the driving shaft 7. The tubular shaft 13 (Fig. 1), or, as the case may be, the tubular shaft 23 (Fig. 5) is castellated exteriorly. Upon it is slidably mounted the sleeve 26 of the main clutch 27; this sleeve is formed interiorly to engage the castellations of the tubular shaft 13 (or 23), so that while the clutch 27 is slidable longitudinally in relation to the other parts it will always be rotated by the shaft 13 (or 23) irrespective of its position along said shaft.

28 is a tubular shaft mounted upon and freely rotatable about the coupler shaft 8; this tubular shaft 28 is fitted with a cylindrical collar 29 at its forward end, and at its rear end with a gear wheel 30; upon it in turn is rotatably mounted another tubular shaft 31 which is similarly provided with a cylindrical collar 32 at its forward end and with a gear wheel 33 at its rear end; another tubular shaft 34, the external diameter of which corresponds with the external diameters of the collars 21, 29, and 32, is rotatably mounted upon the tubular shaft 31, and at the rear end this tubular shaft 34 carries a gear wheel 35. Intermediate between the tubular shaft 34 and the collar 32 is a loose ring 36. The peripheral faces of the collars 21, 29 and 32, as well as the peripheral faces of the ring 36 and of the shaft 34, are all in line, in order that the rollers in the main clutch 27 may be slid endwise over those several parts and set in alinement with any one of them as required, to engage the same. When the rollers contained in the engaging clutch 27 are brought into alinement with any one of these parts by sliding the clutch 27 axially, the collar in alinement with the clutch rollers 20 is engaged by the clutch, and so the engine shaft is connected up to the toothed gear or set on the "neutral" ring 36 as required. On the countershaft 4 are keyed three gear wheels 37, 38, and 39; the wheel 30 engages the wheel 38; the wheel 33 engages the wheel 37 and the wheel 50 the wheel 39. There is a lay shaft 96 below which carries a double toothed wheel 40—97; the toothed wheel 35 is in partial engagement with the part 40 of the wheel 40—97, and the part 97 of said wheel is in meshing alinement with the countershaft wheel 37. The wheel 40—97 is slidable axially along the lay shaft 96, a striking-fork working on the collar 95 being provided to effect the sliding movement when the gear is being put into and taken out of "reverse". To put it into reverse the wheel 40—97 is slid backward so that the part 97 of said wheel is brought into mesh with the wheel 37, the larger part 40 of said wheel meantime remaining in mesh with the wheel 35, the tooth of which is extra long to insure permanent engagement of the wheel 40 therewith in either ahead or reverse positions.

A sleeve 41 is keyed at 42 to the coupler shaft 8; the forward part 43 of this sleeve is castellated and carries a yoke collar 44 which is slidable upon it endwise but is rotated with it. A striking fork 45 on the end of the gear rod 46 moves this yoke collar 44 forward or aft as required. A coiled spring 49 working against the bearing 47 as a seating normally keeps the rod 46 pushed forward and the dog teeth 53 on the yoke collar 44 out of engagement with the dog teeth 54 which are formed on the contiguous faces of the toothed ring 50 which is mounted on the sleeve 41. As the striking fork 93 and the striking fork 45 are both fixed to the rod 46 the disengagement of the dog clutch 53—54 is simultaneous with the disengagement of the wheel 97 and the wheel 37, and vice versa. The gear rod 46 is moved by contact with the end 52 of the hand lever rod 48 which latter carries the striking fork 90 which moves the engaging clutch 26. This construction enables the clutch 26 to be moved over the intermediate or any of the forward driving collars 21, 29 or 32 without disturbing the reversing arrangement; when reverse is required a movement of the hand lever pushes the clutch 26 rearward so as to engage its rollers 20 with the shaft 34 and simultaneously slides the wheel 97 into engagement with the wheel 37 and at the same time locks the yoke collar 44 to the toothed ring 50 whereby the toothed ring 50 is in effect fixed to the coupler shaft 8. The engaging clutch consists of the striking fork collar portion 26, barrel 27, engaging rollers 20, and ramp faces on the interior of the drum portion 55. As shown in Fig. 1 the rod 46 is in the extreme forward position, that is with the reverse disengaged and the engaging clutch rollers 20 are in alinement with the neutral or free ring 36. In this condition, the rotation of the engine is not communicated to any part of the gearing, but it may be remarked it is incidental to the construction that if the engine should "back fire" while being cranked up, the rollers 83 will instantly grip and the shock of the back fire will be communicated directly through the coupler shaft 8 to the crown wheel 9 and driven element and so danger of accident to the chauffeur will be avoided. It will be seen, therefore, that in the neutral and in the ahead positions all the reversing mechanism is disengaged, the layshaft wheel 40—97 being, however, rotated idly by the toothed wheel 35 while the shaft 34 is in rotation. The face of the toothed wheel 35 is longer than the face of the other wheels, the additional length being provided to allow partial engagement of said wheel with the lay shaft wheel 40 under normal running, and to permit also full engagement therewith during astern drive. Any mechanical structure may be used for sliding the wheel 40—97 and the dog clutch 53 forward or backward simultaneously.

Upon the sleeve 41 the gear wheel 50 is rotatably mounted; this gear wheel is cored out with inclined faces similar to the faces 18 shown in Fig. 4, and rollers 51 are contained in the pockets (such as the pockets 19 Fig. 4). The free wheel clutch thus made automatically engages the gear wheel 50 to the sleeve 41 only when the gear wheel 39 is rotated counter-clockwise. It runs free when the countershaft 4 is moving clockwise while being driven through the intermediate or lay shaft wheels 40—97. When the gear is set in reverse and the clockwise movement of the shaft 34 becomes counterclockwise in passing through the lay shaft wheel 40—97 and clockwise again when communicated to the countershaft wheel 37, then the countershaft wheel 39 moves clockwise and under those circumstances the clutch rollers 51 run free. Consequently, reverse drive cannot be applied through the coupler shaft 8, the pinion 11, and the crown wheel 9, unless the wheel 50 is locked to the sleeve 41. This locking is effected as before described by sliding the yoke collar 44 backward until the dog teeth 53 thereon engage the dog teeth 54 which are offset from the side of the wheel 50. When this engagement is effected the clockwise movement of the countershaft 4 is transmitted through the wheel 50, the dog-clutch, sleeve 41, and the coupler shaft 8, to the pinion 11 and thence to the crown wheel 9, which then applies reverse motion to the driven element.

Considerable clearance is left between the teeth 53 and 54 in the dog clutch. The rearward end of the clutch barrel 27 consists of a collar 55 containing a liner 56 having pockets 19 cut in it, which pockets have an inclined outer face 18. In each of said pockets a roller 20 is set. These rollers 20 act as free wheel rollers and engage the liner 56, and with it the collar 55, to that one of the shaft collars 21, 29, 32, 34 and 36, as the case may be, with which the rollers 20 are for the time being set. Obviously, balls or hanging cams may be used instead of rollers in the clutch pockets 19 whereby a similar "wedging" grip is effected between the clutch and the shaft collar with which it is in alinement; but these variations are not illustrated because they are known mechanical substitutes for the roller grip in clutches of the "free wheel" type.

The operation is as follows:

*Direct drive.*—The engaging clutch is moved backward by means of the hand lever rod 48 until its rollers 20 are in alinement with the collar 21. The engine being then driven its motion is communicated through its shafts 7 and 13 and through the clutch rollers 20 and collar 21 to the coupler shaft 8 and the motion of the coupler shaft is transmitted to the pinion 11 and crown wheel 9 to the driven element.

*Intermediate speed.*—The engaging clutch is slid by means of the hand lever rod 48 until its rollers 20 are in alinement with the collar 29. The engine being now rotated, its motion is transmitted through the shafts 7 and 13 and the clutch rollers 20 and collar 29 to the shaft 28 and tooth wheel 30. The clockwise motion of the wheel 30 is transmitted into counter-clockwise movement on the shaft 4 through the toothed wheel 38 which is in engagement with said wheel 30. The counter-clockwise movement of the wheel 39 which is keyed to the countershaft 4 is transmitted into clockwise movement on the wheel 50. The wheel 50 engages the sleeve 41 by means of the clutch rollers 51 and as the sleeve 41 is keyed at 42 to the coupler shaft 8, the coupler shaft is moved clockwise and its motion is transmitted through the pinion 11 and crown wheel 9 to the driven element. The relative diameters of the wheels 30, 38, 39 and 50 determine the reductions in speed.

*Low speed.*—The engaging clutch being moved by the hand lever rod 48 until the clutch rollers 20 are in alinement with the collar 32 the shaft 31 is moved clockwise and with it the toothed wheel 33 which is mounted on it. This clockwise movement of the wheel 33 is transmitted to the countershaft 4 as counterclockwise movement through the toothed wheel 37. The counterclockwise movement of the counter shaft 4 is transmitted back through the toothed wheels 39 and 50 and the clutch rollers 51 to the sleeve 41 which is keyed at 42 to the coupler shaft 8 and is thence transmitted through the pinion 11 and the crown wheel 9 to the driven element.

*Neutral.*—The clutch being set as shown in Fig. 1 rotates the idle ring 36 but does not move any of the gearing.

*Reverse.*—The engaging clutch being moved backward by means of the hand lever rod 48 until the rollers 20 are in alinement with the surface of the shaft 34, clockwise movement is applied to said shaft in the manner before described. At the same time, the contact of the end 52 of the rod 48 with the head 92 of the rod 46 pushes said rod and the striking forks 93 and 45 thereon backward. This backward movement of these striking forks has two effects, it slides back the wheel 40—97 until the wheel 97 is in engagement with the counter shaft wheel 37, the wheel 40 being still in engagement with the wheel 35 on said shaft 34. It also moves backward the collar 44 and brings the dogs 53 thereon into engagement with the dogs 54 on the side of the wheel 50. The clockwise movement of the wheel 35 is translated into counter-clockwise movement in the wheel 40—97 and back again into clockwise movement on the countershaft through the wheel 37. This clockwise movement of the countershaft 4 is translated into counter-clockwise movement of the wheel 50 with which the countershaft wheel 39 gears and this counter-clockwise movement of the wheel 50 is applied to the coupler shaft 8 through the collar 44 and the castellation 43 on the sleeve 41 and the counter-clockwise movement of the coupler-shaft 8 is then transmitted through the pinion 11 and the crown wheel 9 to the driven element.

The engine shaft 7 is not usually connected directly to the engine crank shaft 80. A clutch 81 (see Fig. 2) operated by pedal lever is usually provided to enable the engine to be totally disconnected from the gear when required.

I claim:—

1. In variable speed gearing, the combination of a driving shaft with tubular end and castellated exteriorly, a driven element, a coupler shaft carrying the driven element and journaled at its forward end within the tubular end of the driving shaft, a collar fixed on said coupler shaft, a gear wheel mounted as a free wheel upon said coupler shaft, a plurality of concentric tubular shafts mounted on said coupler shaft, a gear wheel keyed to each of said tubular shafts, a countershaft, gear wheels keyed thereto in permanent mesh with the gear wheels before mentioned, collars on the other ends of said tubular shafts of the same diameter as the coupler shaft collar, and a clutch of the free wheel type rotated by the castellated driving shaft and movable along the same to aline with any one of said collars.

2. In variable speed gearing, the combination of a driving shaft with tubular end and castellated exteriorly, a driven element, a coupler shaft carrying the driven element and journaled at its forward end within the tubular end of the driving shaft, a collar fixed on said coupler shaft, a gear wheel mounted as a free wheel upon said coupler shaft, a plurality of concentric tubular shafts mounted on said coupler shaft, a gear wheel keyed to each of said tubular shafts, a countershaft, gear wheels keyed thereto in permanent mesh with the gear wheels before mentioned, collars on the other ends of said tubular shafts of the same diameter as the coupler shaft collar, a clutch of the free wheel type rotated by the castellated driving shaft and movable along the same to aline with any one of said collars and an additional tubular shaft equal in external diameter to the tubular shaft collars, an intermediate wheel for gearing said tubular shaft with a gear wheel on the counter shaft, a clutch between the coupler shaft and the free wheel gear mounted thereon, and a gear rod for simultaneously locking said clutch and bringing the main driving clutch into alinement with said additional tubular shaft.

3. In variable speed gearing, the combination of a driving shaft with tubular end and castellated exteriorly, a driven element, a coupler shaft carrying the driven element and journaled at its forward end within the tubular end of the driving shaft, a collar fixed on said coupler shaft, a gear wheel mounted as a free wheel upon said coupler shaft, a plurality of concentric tubular shafts mounted on said coupler shaft, a gear wheel keyed to each of said tubular shafts, a counter shaft, gear wheels keyed thereto in permanent mesh with the gear wheels before mentioned, collars on the other ends of said tubular shafts of the same diameter as the coupler shaft collar, a clutch of the free wheel type rotated by the castellated driving shaft and movable along the same to aline with any one of said collars and a clutch of the free wheel type interposed between the driving shaft and the coupler shaft, which clutch engages automatically when the speed of the coupler shaft exceeds the speed of the driving shaft.

4. In a variable speed gearing, a coupler shaft, a driving shaft coaxial therewith, a driven element geared with said coupler shaft, a countershaft parallel with said driven element, a plurality of tubular shafts mounted on the coupler shaft, gear wheels keyed to said tubular shafts and to said counter shaft and in permanent mesh, a free wheel gear on said coupler shaft in permanent mesh with a gear on said counter shaft, means for locking said free wheel gear to the coupler shaft, a gear on one of said tubular shafts and a gear on the counter-shaft, an intermediate gear wheel in permanent mesh with said gear on said tubular shaft and slidable into engagement with said gear on the counter shaft, collars of uniform diameter on said coupler shaft and tubular shafts, a clutch of the free wheel type slidably mounted on the driving element, a rod for sliding said clutch into alinement with any one of said collars and for closing the locking means between the coupler shaft and its free wheel gear, and simultaneously sliding the intermediate gear wheel into engagement.

5. In a variable speed gearing of the class herein described, a coupler shaft and a gear wheel mounted thereon, a driving shaft, an "ahead" clutch between the said coupler shaft and the said gear wheel, tubular shafts, an "ahead" clutch transmitting motion from the driving shaft to the said tubular shafts, and a "reverse" clutch between the coupler shaft and the said driving shaft for engaging the same thereto when moving at a faster rate than said driving shaft.

6. In a variable speed gearing a driving shaft, a counter shaft, an "ahead" clutch, a coupler shaft directly geared to said counter shaft through said "ahead" clutch, means for locking said clutch, and tubular shafts mounted on said coupler shaft, gears on said tubular shafts, gears on the counter shaft meshing with said gears on the said tubular shafts, an "ahead" clutch through which said tubular shafts and said counter shaft are engageable to the driving shaft, and a "reverse" clutch between the coupler shaft and the driving shaft.

In testimony whereof I have affixed my signature in presence of two witnesses.

GEORGE THOMAS CAVILL.

Witnesses:
N. J. CANDRICK,
W. J. DAVIS.